United States Patent
Schmidt et al.

(10) Patent No.: US 12,544,485 B2
(45) Date of Patent: Feb. 10, 2026

(54) METHOD TO PREVENT PROPAGATION OF IRREGULAR ELECTROMECHANICAL WAVES IN THE MYOCARDIUM BY CREATING LINES OF INCREASED TISSUE CONDUCTIVITY

(71) Applicant: Universität Heidelberg, Heidelberg (DE)

(72) Inventors: Constanze Schmidt, Heidelberg (DE); Stefan Kallenberger, Heidelberg (DE); Hugo Katus, Heidelberg (DE)

(73) Assignee: UNIVERSITÄT HEIDELBERG, Heidelberg (DE)

( * ) Notice: Subject to any disclaimer, the term of this patent is extended or adjusted under 35 U.S.C. 154(b) by 1160 days.

(21) Appl. No.: 17/269,495

(22) PCT Filed: Aug. 23, 2019

(86) PCT No.: PCT/EP2019/072591
§ 371 (c)(1),
(2) Date: Feb. 18, 2021

(87) PCT Pub. No.: WO2020/039071
PCT Pub. Date: Feb. 27, 2020

(65) Prior Publication Data
US 2021/0322631 A1 Oct. 21, 2021

(30) Foreign Application Priority Data
Aug. 23, 2018 (EP) .................................... 18190505

(51) Int. Cl.
| A61L 27/08 | (2006.01) |
| A61L 27/04 | (2006.01) |
| A61L 27/38 | (2006.01) |
| B82Y 5/00  | (2011.01) |
| B82Y 30/00 | (2011.01) |
| B82Y 40/00 | (2011.01) |

(52) U.S. Cl.
CPC .............. *A61L 27/08* (2013.01); *A61L 27/04* (2013.01); *A61L 27/3826* (2013.01); *A61L 2300/104* (2013.01); *A61L 2400/06* (2013.01); *A61L 2400/12* (2013.01); *A61L 2430/20* (2013.01); *B82Y 5/00* (2013.01); *B82Y 30/00* (2013.01); *B82Y 40/00* (2013.01)

(58) Field of Classification Search
CPC ...... A61L 27/08; A61L 27/04; A61L 27/3826; A61L 2300/104; A61L 2400/06; A61L 2400/12; A61L 2430/20; A61L 2430/02; B82Y 5/00; B82Y 30/00; B82Y 40/00
See application file for complete search history.

(56) References Cited

U.S. PATENT DOCUMENTS

| 5,551,427 A * | 9/1996 | Altman ..................... A61F 2/00 607/121 |
| 6,251,418 B1 | 6/2001 | Ahern et al. |
| 7,103,418 B2 | 9/2006 | Laske et al. |
| 8,529,550 B2 | 9/2013 | Rosenman et al. |
| 10,988,735 B2 | 4/2021 | Mei et al. |
| 11,529,522 B2 | 12/2022 | Bornzin et al. |
| 2004/0167558 A1 | 8/2004 | Igo et al. |
| 2010/0324643 A1 | 12/2010 | Brabec et al. |
| 2018/0085496 A1 | 3/2018 | Fahmy et al. |
| 2020/0407577 A1 | 12/2020 | Gatenholm et al. |
| 2022/0273845 A1 | 9/2022 | Nikkhah et al. |

FOREIGN PATENT DOCUMENTS

| WO | WO 2012/125638 A2 | 9/2012 | |
| WO | WO-2015160793 A1 * | 10/2015 | ........... A61K 9/0019 |

OTHER PUBLICATIONS

Progress in cardiovascular diseases (Year: 2013), attachment only.*
International Preliminary Report on Patentability issued Feb. 23, 2021 in International Application No. PCT/EP2019/072591, in 12 pages.
International Search Report and Written Opinion mailed Jan. 23, 2020 in International Application No. PCT/EP2019/072591, in 21 pages.
Mihic et al., "A Conductive Polymer Hydrogel Supports Cell Electrical Signaling and Improves Cardiac Function After Implantation into Myocardial Infarct", *Circulation*, vol. 132, No. 8, Aug. 24, 2015, pp. 772-784.
Monteiro et al., "Restoring heart function and electrical integrity: closing the circuit", *NPJ Regenerative Medicine*, vol. 2, No. 1, Apr. 7, 2017, in 14 pages.

(Continued)

*Primary Examiner* — Snigdha Maewall
(74) *Attorney, Agent, or Firm* — Knobbe, Martens, Olson & Bear, LLP (57) ABSTRACT

The present invention relates to compositions, methods, and devices for preventing irregular electromechanical waves in the myocardium that lead to pathological conditions as arrhythmia. In particular, the invention relates to compositions and methods to increase the conductivity of the myocardium to restore an impairment of the electrical conduction system of the heart. To that end substances with high conductivity, as carbon nanotube suspensions or metal nanowire suspensions, are injected in the myocardium at closely adjacent locations on circular or open lines or are introduced in patches of cardiomyocytes that are subsequently placed on the myocardium.

13 Claims, 6 Drawing Sheets

(56) References Cited

OTHER PUBLICATIONS

Akhtar AA, Breunig JJ. "Tetracycline-inducible and reversible stable gene expression in human iPSC-derived neural progenitors and in the postnatal mouse brain." *Curr Protoc Stem Cell Biol.* 2017;41:5A.9.1-5A.9.12. doi:10.1002/cpsc.28.
Arnoldussen YJ, Anmarkrud KH, Skaug V, Apte RN, Haugen A, Zienolddiny S. "Effects of carbon nanotubes on intercellular communication and involvement of IL-1 genes." *J Cell Commun Signal.* 2016;10: 153-162. doi:10.1007/s12079-016-0323-0.
Bond R, Olshansky B, Kirchhof P. "Recent advances in rhythm control for atrial fibrillation." *F1000Research.* 2017;6: 1796. doi:10.12688/f1000research.11061.1.
Byrne SM, Mali P, Church GM. "Genome editing in human stem cells." *Meth Enzymol.* 2014;546:119-138. doi:10.1016/B978-0-12-801185-0.00006-4.
Castaño J, Bueno C, Jiménez-Delgado S, et al. "Generation and characterization of a human iPSC cell line expressing inducible Cas9 in the "safe harbor" AAVS1 locus." *Stem Cell Res.* 2017;21:137-140. doi:10.1016/j.scr.2017.04.011.
Chen, P et al. "Carbon nanotubes: a future material of life." *IUBMB life* vol. 49,2 (2000): 105-8. doi:10.1080/15216540050022403.
Christoph J, Chebbok M, Richter C, Schröder-Schetelig J, Bittihn P, Stein S, et al. "Electromechanical vortex filaments during cardiac fibrillation." *Nature.* 2018;555: 667-672. doi:10.1038/nature26001.
Christoforou N, Liau B, Chakraborty S, Chellapan M, Bursac N, Leong KW. "Induced Pluripotent Stem Cell-Derived Cardiac Progenitors Differentiate to Cardiomyocytes and Form Biosynthetic Tissues." *PLoS One.* 2013;8(6). doi:10.1371/journal.pone.0065963.
Cyganek L, Tiburcy M, Sekeres K, et al. "Deep phenotyping of human induced pluripotent stem cell-derived atrial and ventricular cardiomyocytes." *JCI Insight.* 3(12). doi:10.1172/jci.insight.99941.
Funakoshi S, Miki K, Takaki T, et al. "Enhanced engraftment, proliferation, and therapeutic potential in heart using optimized human iPSC-derived cardiomyocytes." *Scientific Reports.* 2016;6:19111. doi:10.1038/srep19111.
Gao L, Gregorich ZR, Zhu W, et al. "Large Cardiac Muscle Patches Engineered From Human Induced-Pluripotent Stem Cell-Derived Cardiac Cells Improve Recovery From Myocardial Infarction in Swine." *Circulation.* 2018; 137(16):1712-1730. doi:10.1161/CIRCULATIONAHA.117.030785.
Guillem MS, Climent AM, Rodrigo M, Fernández-Avilés F, Atienza F, Berenfeld O. "Presence and stability of rotors in atrial fibrillation: evidence and therapeutic implications." *Cardiovasc Res.* 2016; 109: 480-492. doi:10.1093/cvr/cvw011.
Jalife J, Berenfeld O, Mansour M. "Mother rotors and fibrillatory conduction: a mechanism of atrial fibrillation." *Cardiovasc Res.* 2002;54: 204-216.
Hotta A, Yamanaka S. "From Genomics to Gene Therapy: Induced Pluripotent Stem Cells Meet Genome Editing." *Annual Review of Genetics.* 2015;49(1):47-70. doi:10.1146/annurev-genet-112414-054926.
Huber I, Itzhaki I, Caspi O, et al. "Identification and selection of cardiomyocytes during human embryonic stem cell differentiation." *The FASEB Journal.* 2007;21(10):2551-2563. doi: 10.1096/fj.05-5711com.
Hummer, G., et al. "Water conduction through the hydrophobic channel of a carbon nanotube." *Nature* 414, 188-190 (2001). https://doi.org/10.1038/35102535.
Ke Q, Li L, Cai B, et al. "Connexin 43 is involved in the generation of human-induced pluripotent stem cells." *Hum Mol Genet.* 2013;22(11):2221-2233. doi:10.1093/hmg/ddt074.
Madonna R, Van Laake LW, Botker HE, et al. "ESC Working Group on Cellular Biology of the Heart: Position paper for Cardiovascular Research: tissue engineering strategies combined with cell therapies for cardiac repair in ischaemic heart disease and heart failure." *Cardiovasc Res.* 2019; 115(3):488-500. doi:10.1093/cvr/cvz010.
Martinelli V, Cellot G, Toma FM, Long CS, Caldwell JH, Zentilin L, et al. "Carbon Nanotubes Instruct Physiological Growth and Functionally Mature Syncytia: Nongenetic Engineering of Cardiac Myocytes." *ACS Nano.* 2013;7: 5746-5756. doi:10.1021/nn4002193.
Mattson, M P et al. "Molecular functionalization of carbon nanotubes and use as substrates for neuronal growth." *Journal of molecular neuroscience : MN* vol. 14,3 (2000): 175-82. doi:10.1385/JMN:14:3:175.
Nattel S, Xiong F, Aguilar M. "Demystifying rotors and their place in clinical translation of atrial fibrillation mechanisms." *Nat Rev Cardiol.* 2017; 14: 509-520. doi:10.1038/nrcardio.2017.37.
Pandit SV, Jalife J. "Rotors and the dynamics of cardiac fibrillation." *Circ Res.* 2013;112: 849-862. doi:10.1161/CIRCRESAHA.111.300158.
Rao MS, Malik N. "Assessing iPSC reprogramming methods for their suitability in translational medicine." *Journal of Cellular Biochemistry.* 2012;113(10):3061-3068. doi:10.1002/jcb.24183.
Schmidt C, Kisselbach J, Schweizer PA, Katus HA, Thomas D. "The pathology and treatment of cardiac arrhythmias: focus on atrial fibrillation." *Vasc Health Risk Manag.* 2011;7: 193-202. doi:10.2147/VHRM.S10758.
Schmidt C, Wiedmann F, Katus H, Thomas D, Müller O. "Konk3-based gene therapy of cardiac arrhythmia." Apr. 2019. WO2019073058A1.
Schricker AA, Lalani GG, Krummen DE, Narayan SM. "Rotors as drivers of atrial fibrillation and targets for ablation." *Curr Cardiol Rep.* 2014; 16: 509. doi:10.1007/s11886-014-0509-0.
Shi Y, Inoue H, Wu JC, Yamanaka S. "Induced pluripotent stem cell technology: A decade of progress." *Nat Rev Drug Discov.* 2017; 16(2):115-130. doi:10.1038/nrd.2016.245.
Shim, M, et al., H 2002, 'Functionalization of Carbon Nanotubes for Biocompatibility and Biomolecular Recognition', *Nano letters*, vol. 2, No. 4, pp. 285-288.
Sottas V, Wahl C-M, Trache MC, et al. "Improving electrical properties of iPSC-cardiomyocytes by enhancing Cx43 expression." *Journal of Molecular and Cellular Cardiology.* 2018;120:31-41. doi:10.1016/j.yjmcc.2018.05.010.
Sugiura T, Hibino N, Breuer CK, Shinoka T. "Tissue-engineered cardiac patch seeded with human induced pluripotent stem cell derived cardiomyocytes promoted the regeneration of host cardiomyocytes in a rat model." *J Cardiothorac Surg.* 2016; 11(1):163. doi:10.1186/s13019-016-0559-z.
Sun H, Lü S, Jiang X-X, Li X, Li H, Lin Q, et al. "Carbon nanotubes enhance intercalated disc assembly in cardiac myocytes via the β1-integrin-mediated signaling pathway." *Biomaterials.* 2015;55: 84-95. doi:10.1016/j.biomaterials.2015.03.030.
Veevers J, Farah EN, Corselli M, et al. "Cell-Surface Marker Signature for Enrichment of Ventricular Cardiomyocytes Derived from Human Embryonic Stem Cells." *Stem Cell Reports.* 2018;11(3):828-841. doi:10.1016/j.stemcr.2018.07.007.
Wang J, Bourne GW, Wang Z, Villemaire C, Talajic M, Nattel S. "Comparative mechanisms of antiarrhythmic drug action in experimental atrial fibrillation. Importance of use-dependent effects on refractoriness." *Circulation.* 1993;88: 1030-1044.
Wendel JS, Ye L, Tao R, et al. "Functional Effects of a Tissue-Engineered Cardiac Patch From Human Induced Pluripotent Stem Cell-Derived Cardiomyocytes in a Rat Infarct Model." *Stem Cells Transl Med.* 2015;4(11):1324-1332. doi:10.5966/sctm.2015-0044.
Wickham A, Vagin M, Khalaf H, Bertazzo S, Hodder P, Dånmark S, et al. "Electroactive biomimetic collagen-silver nanowire composite scaffolds." *Nanoscale.* 2016;8: 14146-14155. doi: 10.1039/c6nr02027e.
Zaragosi L-E, Billon N, Ailhaud G, Dani C. "Nucleofection is a valuable transfection method for transient and stable transgene expression in adipose tissue-derived stem cells." *Stem Cells.* 2007;25(3):790-797. doi:10.1634/stemcells.2006-0235.

\* cited by examiner

METHOD TO PREVENT PROPAGATION OF IRREGULAR ELECTROMECHANICAL WAVES IN THE MYOCARDIUM BY CREATING LINES OF INCREASED TISSUE CONDUCTIVITY

CROSS REFERENCE TO RELATED APPLICATIONS

This application is the United States National Phase application under 35 U.S.C. § 371 of International Patent Application No. PCT/EP2019/072591, filed Aug. 23, 2019, which claims the benefit of priority to European Patent Application No. 18190505.0, filed Aug. 23, 2018, the entire contents of each of which is incorporated by reference herein.

The present invention relates to compositions, methods, and devices for preventing irregular electromechanical waves in the myocardium that lead to pathological conditions as arrhythmia. In particular, the invention relates to compositions and methods to increase the conductivity of the myocardium to restore an impairment of the electrical conduction system of the heart. To that end substances with high conductivity, as carbon nanotube suspensions or metal nanowire suspensions, are injected in the myocardium at closely adjacent locations on circular or open lines. Alternatively, patches of cardiomyocytes comprising such lines of increased conductivity are attached to the myocardium.

BACKGROUND

In the healthy heart, periodic signals of the sinoatrial node cause electromechanical waves with ordered wave fronts perpendicular to the electrical heart axis over the atria and the ventricles. To stimulate contraction of the myocardium of the ventricles, depolarization waves are propagated to the atrioventricular (AV) node and via the left and right bundle of His and Purkinje fibers to the myocardium of the ventricles. Synchronized contractions of the atria and the ventricles require an intact electrical conduction system of the heart and homogeneous tissue conductivity, which is linked to a homogeneous propagation speed of depolarization waves in the myocardium. Hypoxia or aging processes can cause fibrotic lesions or impairments of the electrical conduction system resulting in locally decreased conductivity representing barriers to electromechanical waves. Therefore, locally decreased conductivity can cause distortions of wave fronts that potentially result in rotating waves also denoted as rotors [1-4]. Recently, techniques were developed to image and quantitatively investigate rotors in the beating heart [5].

Cardiac arrhythmias represent a major disease burden. Especially, atrial fibrillation is a frequent cardiological disease with prevalence between 1 and 2% that is expected to further increase due to demographic transition [6]. At present, interventional approaches are based on catheter-based ablation. An ablation can be performed either by applying heat or cold to the myocardium which causes local tissue defects leading to scar formation. By strategically placing ablation scars, rotating waves leading to arrhythmias should be prevented [4,7,8]. However, ablation therapies as pulmonary vein isolation are controversial because their result is often insufficient and relapse of arrhythmias is a frequent outcome [9].

BRIEF DESCRIPTION OF THE DRAWINGS

FIG. 1: Depicts the injection of the conductive material of the invention in accordance with different embodiments of the invention. Panel A: The conductive material is injected from the outside of the heart, i.e. epicardially, in circular lines into the outer wall of the right atrium (RA). Panels B to D: The conductive material is injected from the inside of the RA into the inner wall of the RA, i.e. endocardially, preferably through a catheter inserted into the RA. Panel B: The conductive material is injected by multiple injections along circular lines with a needle inserted through the catheter, Panel C: The conductive material is injected by multiple injections along a straight line in an area between the RA and left atrium (LA) and Panel D: Injection is carried out through a cage that has been placed in the RA by means of an inflatable balloon. Panel E: Injection of a suspension of conductive materials to restore tissue conductivity in case of left bundle branch blocks (LBBB). The intact right bundle is indicated as solid line, the defective left bundle as dotted line. Black dots represent injection sites. Further abbreviations used: LV, left ventricle; RV, right ventricle.

FIG. 5 Shows a depolarization wave in patch of cardiomyocytes in Matrigel. HL-1 cells (murine cardiomyocytes) were stained with a fluorescent dye (Fluo-8 AM) indicating calcium ion release caused by depolarization. Fluorescence is visualized as gray values. Depolarization waves were triggered by applying an external electrical field. The image sequence from left to right indicate one cycle of depolarizations (time interval between images: 67 ms). The wave starts before frame 5 from cells at the bottom and is propagated to the top of the images.

FIG. 6 Shows depolarization waves in patch of cardiomyocytes growing in a suspension of silver nanowires in Matrigel. Panel A: Transmission light microscopic image of cardiomyocytes. Panel B: Time-resolved fluorescence microscopy of HL-1 cells. Cells were stained with Fluo-8 AM, indicating calcium ion release, is visualized as gray values. Depolarization waves were triggered by applying an external electrical field (time interval between images: 67 ms). Two cycles of depolarization can be observed, one between frames 1 and 5, the second between frames 6 and 10. Depolarization waves start in frames 1 and 5 at the bottom of the image and arrive in frames 3 and 8 at the top of the image.

SUMMARY

In a first aspect the present invention relates to conductive material for use in the therapy or prevention of irregular electromechanical waves in the myocardium for treating a cardiovascular disease.

In a second aspect the present invention relates to a patch of cardiomyocytes suitable for placement on the myocardium comprising lines of enhanced conductivity formed by a conductive material selected from a plurality of conductive particles, a mesh or wire, or a plurality of cardiomyocytes expressing at least one conductive protein.

In a third aspect the present invention relates to the use of the patch of cardiomyocytes according to the second aspect in a method of treatment or prevention of irregular electromechanical waves in the myocardium for treating a cardiovascular disease.

In a fourth aspect the present invention relates to an injection catheter configured to locally inject conductive material as used according to the first aspect of the invention into the myocardium comprising or consisting of a catheter tube, and an injection device configured to be moved in and out of the catheter.

In a fifth aspect the present invention relates to an injection catheter configured to locally inject conductive material as used according to the first aspect of the invention into the myocardium comprising or consisting of an inflatable balloon configured to unfold a cage in the RA and a cage comprising injection ducts and injection needles for injecting said conductive materials at locations on one or several circular lines.

In a sixth aspect the present invention relates to methods of treating or preventing irregular electromechanical waves in the myocardium for treating a cardiovascular disease using the conductive material for use according to the first aspect of the invention or the patch of cardiomyocytes according to the second aspect of the invention.

DETAILED DESCRIPTION

While ablation therapies are based on locally decreasing the tissue conductivity, the present inventors developed a novel approach to abrogate rotating waves by increasing the tissue conductivity.

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Preferably, the terms used herein are defined as described in "A multilingual glossary of biotechnological terms: (IUPAC Recommendations)", Leuenberger, H. G. W, Nagel, B. and Kölbl, H. eds. (1995), Helvetica Chimica Acta, CH-4010 Basel, Switzerland).

Throughout this specification and the claims, which follow, unless the context requires otherwise, the word "comprise", and variations such as "comprises" and "comprising", will be understood to imply the inclusion of a stated integer or step or group of integers or steps but not the exclusion of any other integer or step or group of integers or steps. In the following passages, different aspects of the invention are defined in more detail. Each aspect so defined may be combined with any other aspect or aspects unless clearly indicated to the contrary. In particular, any feature indicated as being optional, preferred or advantageous may be combined with any other feature or features indicated as being optional, preferred or advantageous.

Several documents are cited throughout the text of this specification. Each of the documents cited herein (including all patents, patent applications, scientific publications, manufacturer's specifications, instructions etc.), whether supra or infra, is hereby incorporated by reference in its entirety. Nothing herein is to be construed as an admission that the invention is not entitled to antedate such disclosure by virtue of prior invention. Some of the documents cited herein are characterized as being "incorporated by reference". In the event of a conflict between the definitions or teachings of such incorporated references and definitions or teachings recited in the present specification, the text of the present specification takes precedence.

In the following, the elements of the present invention will be described. These elements are listed with specific embodiments; however, it should be understood that they may be combined in any manner and in any number to create additional embodiments. The variously described examples and preferred embodiments should not be construed to limit the present invention to only the explicitly described embodiments. This description should be understood to support and encompass embodiments which combine the explicitly described embodiments with any number of the disclosed and/or preferred elements. Furthermore, any permutations and combinations of all described elements in this application should be considered disclosed by the description of the present application unless the context indicates otherwise.

DEFINITIONS

In the following, some definitions of terms frequently used in this specification are provided. These terms will, in each instance of its use, in the remainder of the specification have the respectively defined meaning and preferred meanings.

The term "carbon nanotube" is used in the context of the present invention to refer to microscopically small cylindrical molecular nanotubes consisting of carbon.

The term "nanowire" is used in the context of the present invention to refer to microscopically thin metal wires (e.g. gold, platinum or silver) with a thickness in the order of nanometers to micrometers. Typically, such wires have a diameter of less than 1 μm to ascertain injectability through a fine needle. More preferably, the diameter of nanowire is less than 500 nm, less than 100 nm, or less than 50 nm. The ratio of length to diameter is preferably at least 3:1, more preferably 10:1, more preferably 100:1, more preferably 300:1, even more preferably of 500:1 or more. Longer nanowires are more likely to contact each other once injected into the myocardium and are therefore more suitable to create a continuous line of increased conductivity in the myocardial tissue.

The term "conductive" or "conductivity" are used in the context of the present invention to refer to the ability of a material to conduct electrons. It is well known in the art how to measure conductivity of a solid material. In solution or suspensions conductivity is typically measured with an electrical conductivity meter (EC meter). EC meters typically employ a potentiometric method and four electrodes. Often, the electrodes are cylindrical and arranged concentrically. The electrodes are usually made of platinum. An alternating current is applied to the outer pair of the electrodes and then the potential between the inner pair is measured. Conductivity is temperature dependent and, thus is commonly measured at 298 K to ascertain comparability of the measurements.

The term "electromechanical wave" is used in the context of the present invention to refer to waves of cardiomyocytes membrane potential changes, depolarizations and mechanical contractions.

The term "injection line" is used in the context of the present invention to refer to closely adjacent injections of materials on lines in the myocardium tissue.

The term "electrical axis of the heart" is used in the context of the present invention to refer to an axis extending over the atria and the ventricles, along which the electromechanical waves are propagated in the myocardium. The vector representing the electrical heart axis originates from the AV node, and usually points towards the left ventricle.

In several cases, the conventional therapy for cardiac arrhythmias, ablation therapy, as pulmonary vein isolation, is not effective or might even induce secondary arrhythmias. In this case, creating circular or straight lines of increased tissue conductivity by applying conductive materials to the myocardium, e.g. by injecting conductive material into the myocardium or attaching conductive material to the myocardium represents an effective treatment.

Therefore the present invention relates in a first aspect to a conductive material for use in the therapy or prevention of irregular electromechanical waves in the myocardium for treating a cardiovascular disease. Conductive material can be injected into the myocardium to create lines with increased conductivity.

In the context of the present specification, the term "irregular mechanical waves" refers not only to forms of arrhythmia, but includes non-regular mechanical waves caused by a degenerated or interrupted electrical conduction system, such as any forms of AV blockade and complete or incomplete left or right bundle branch block.

In a preferred embodiment the conductive material is selected from injectable conductive materials, e.g. a conductive emulsion, a conductive suspension, a conductive solution; or non-injectable materials, e.g. a mesh or a wire. It is preferred that conductive chemically inert materials, e.g. noble metals or carbon are used for injection to avoid resorption by the tissue.

Conductive suspensions preferably comprise a chemically inert solid conductive substance suspended in a physiologically acceptable liquid carrier, e.g. phosphate buffered saline solution, collagen gels, silicone gels, steroid solution, glucose solution, hydroxyethyl starch solution or sodium chloride solution. The solid conductive substance is typically sized to prevent or reduce separation from the liquid carrier. Typically, this can be achieved by using micro or nanoparticles with an average diameter or length (in case of nanotubes or nanowires) of less than 100 μm, more preferably less than 50 μm, even more preferably less than 10 μm. Typically, the size of such particles can be measured by electron microscopy. Preferred suspensions comprise solid carbon micro particles, preferably fullerenes, e.g. carbon nanotubes, graphene, buckminsterfullerene (buckyballs, $C_{60}$) or amorphous carbon powder; or noble metal micro particles or nanowires, preferably silver, gold or platinum micro particles or nanowires or mixtures thereof. The suspension may further comprise steroids, other anti-inflammatory drugs or fluorescent dyes for imaging.

In certain embodiments of the present invention a conductive mesh or wire is attached to the myocardium. Such mesh or wire comprises or consists of a biologically compatible metal, preferably a noble metal or is a non-metal biologically compatible material coated with such noble metal.

The conductivity of amorphous carbon is between 1.25 to $2 \times 10^3$ S/m. The conductivity of a biologically compatible semiconductor or metals is higher. The conductivity of, e.g. silver is $68.2 \times 10^6$ S/m, t of gold $48.8 \times 10^6$ S/m, of platinum $10.4 \times 10^6$ S/m and of palladium $10 \times 10^6$ S/m. Thus, in embodiments of the invention in which a wire or a mesh is attached to the myocardium the conductivity of the conductive material for use according to the present invention will be essentially identical to the conductivity of the pure conductive noble metal (unless a noble metal alloy is used for the mesh or wire, which may have a conductivity different from the pure noble metal as generally known in the art). However, in those embodiments in which the conductive material for use according to the present invention is a suspension of a conductive substance, it is understood by the skilled person that the overall conductivity of the suspension will not only be determined by the conductive substance but also by the conductivity of the physiologically acceptable liquid carrier and the concentration of the conductive substance in the physiologically acceptable liquid carrier. The overall conductivity will therefore be lower than the conductivity of the pure conductive substance. Thus, in a preferred embodiment the conductive material has a conductivity of at least $1 \times 10^3$ S/m at 298 K, more preferably at least $1 \times 10^4$ S/m at 298 K, more preferably $1 \times 10^5$ S/m at 298 K and most preferably $1 \times 10^6$ S/m at 298 K. In case that the conductive material is a suspension the overall conductivity may be 2-fold, 5-fold or 10-fold lower than the conductivity of the pure conductive substance.

To ascertain a high conductivity of the conductive suspension it is desired that the concentration of the conductive substance in the suspension is on one hand as high as possible while on the other hand the injectability of the suspension through a fine needle is maintained. Since the different conductive substances that may be comprised in the conductive suspensions usable according to the present invention have different densities the preferred ratios of physiologically acceptable liquid carrier and conductive substance are indicated in the following not by weight ratios but by volume ratios. It is preferred that a conductive suspension comprises at least 5 Vol % of a conductive substance or a mixture of two or more conductive substances, preferably at least 10 Vol % of a conductive substance or a mixture of two or more conductive substances, more preferably at least 15 Vol % of a conductive substance or a mixture of two or more conductive substances and even more preferably at least 20 Vol % of a conductive substance or a mixture of two or more conductive substances.

In a preferred embodiment the cardiovascular disease is selected from the group consisting of arrhythmia, preferably atrial fibrillation, first, second or third-degree atrioventricular node block, left, right or trifascicular bundle branch block, sinus node dysfunction, Bachmann bundle dysfunction, atrial conducting disorder, His bundle dysfunction, pathological alterations of the electrical conduction system of the heart, dysfunction of the electro-mechanical coupling, mitochondrial or sarcomere disorders, metabolic diseases as M. Wilson, channelopathies, ischemia, fibrosis or inflammation of the myocardium, and iatrogenic defects of the myocardium as consequence of ablation therapy.

Figure 4:
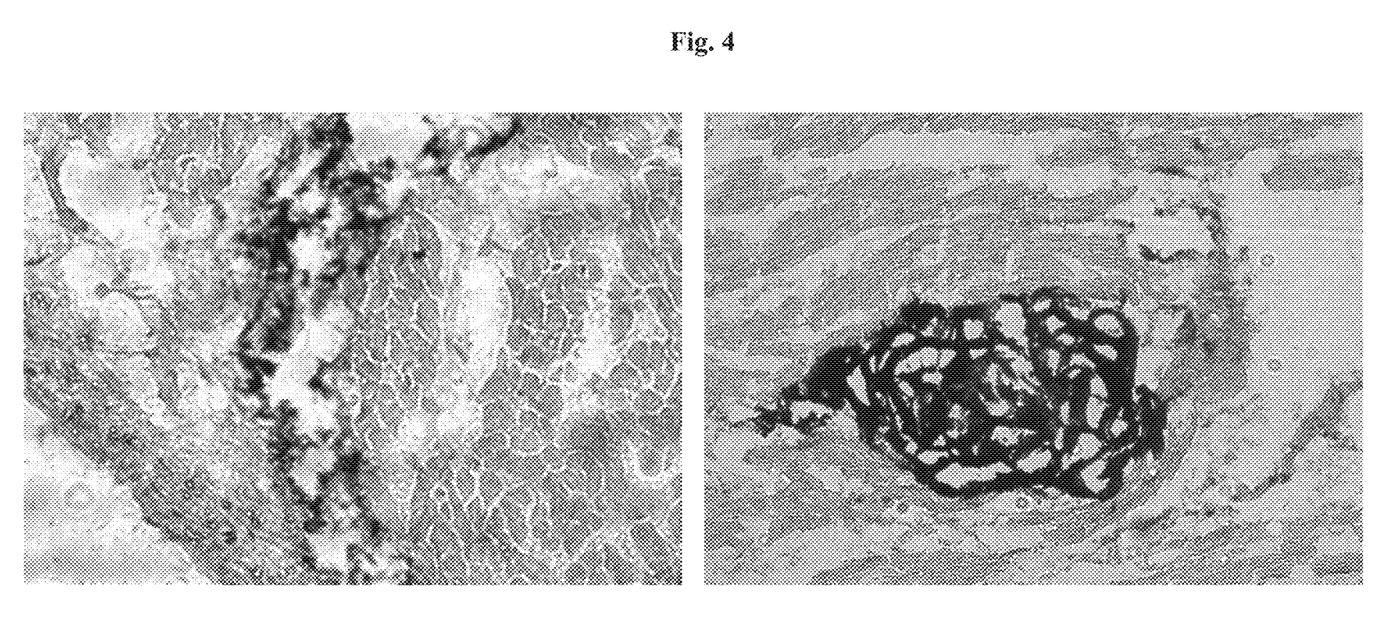
FIG. 4 Shows distribution of injected silver nanowires in porcine myocardium tissue. (left) Section parallel to the injection channel. Silver nanowires are visible as dark black structures. (right) Section perpendicular to the injection channel.

In a preferred embodiment the conductive material is injected into the myocardium on one or more circular or open lines. Typically, spaces between injection sites are small, e.g., several millimeters, to allow local distribution of the injected suspensions in the myocardium tissue. After injection, a liquid carrier like sodium chloride solution, glucose solution or collagen solution will be resorbed and the conductive substance will remain in the tissue. FIG. 4 shows the spatial distribution of nanowires in porcine myocardium after injection of a silver nanowire suspension.

The injection into the myocardium thus results in the presence of conductive material in the myocardium in lines having a defined orientation relative to the electrical axis of the heart. In a preferred embodiment, the conductive material is injected in circular lines perpendicular to the electrical axis of the heart.

Figure 2:
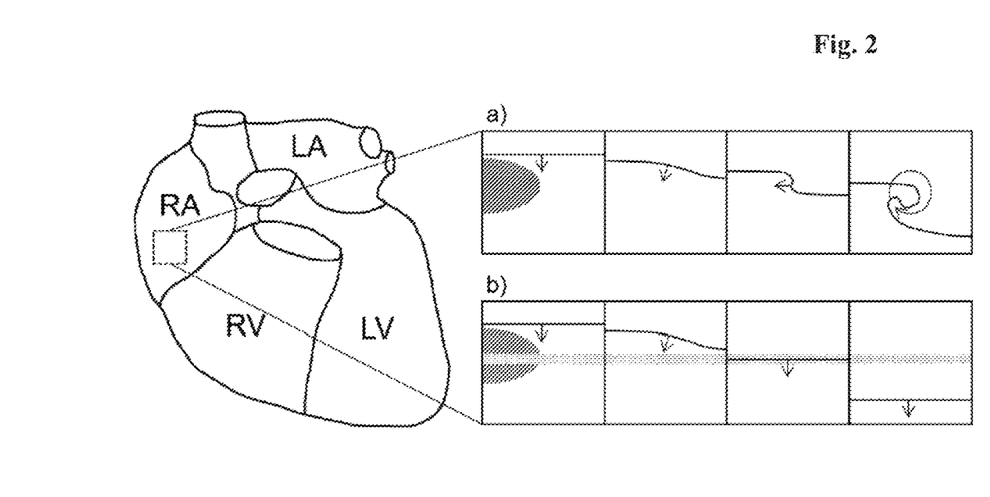
FIG. 2: Illustrates the concept of inhibiting rotating electromechanical waves by injecting conducting materials in lines perpendicular to the normal direction of depolarization waves. (a) Scar formation (grey shaded area) can reduce the conductivity of myocardium tissue and trigger rotating electromechanical waves. Arrows attached to thin lines indicate the directions of electromechanical wave propagation. (b) Conductive materials as carbon nanotubes or metal nanowires can be injected in lines (shaded horizontal bar) perpendicular to the physiologic direction of electromechanical wave propagation. These lines will serve as equipotential lines to avoid rotating waves by synchronizing depolarizations of cardiomyocytes (LA, left atrium; RA, right atrium; LV, left ventricle; RV, right ventricle).
Figure 3:
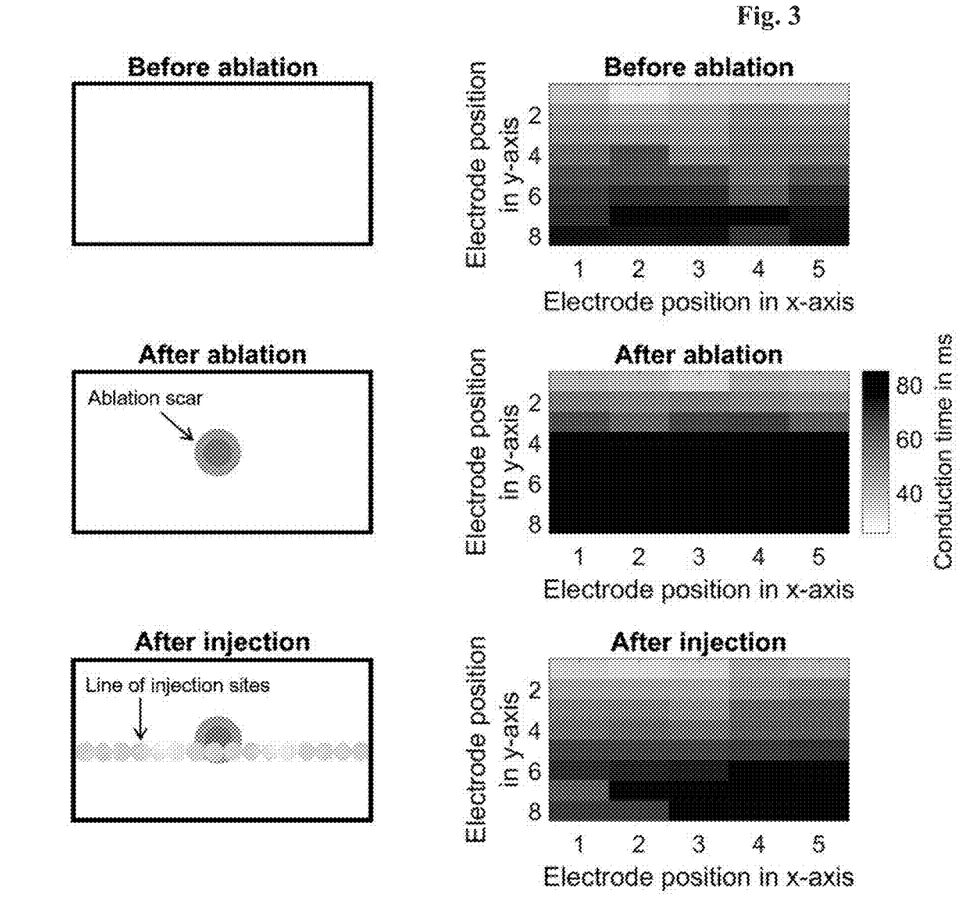
FIG. 3: Shows experimental measurements of electrical conduction times in the myocardium of a pig and the effect of injecting a suspension of silver nanowires on a line of injection sites. The left panel illustrates the experimental procedure. The right panel shows measurements of conduction times, visualized as gray values. During open heart surgery of an anesthetized pig, an electrode array (8×5 electrodes) was connected to the myocardium of the right atrium. Propagation of electromechanical waves was measured by detecting time differences between peaks of action potentials between array electrodes and a reference electrode at the upper end of the electrode array. Measurements were performed before (top row, values between 30 and 78 ms) and after placing a central scar (middle row, values between 35 and 92 ms). After injecting a suspension of silver nanowires on a line perpendicular to the direction of electromechanical wave propagation, conduction times were measured again (bottom row, values between 33 and 82 ms). Essentially, experimental measurements showed that placing an injection line decreased conduction times in the myocardium tissue to values similar as before placing the ablation scar.

In a preferred embodiment the circular lines serve as equipotential lines and inhibit rotating electromechanical waves. Rotating electromechanical waves cause arrhythmias as atrial fibrillation, atrial flutter or left atrial tachycardia. In this context, conductive material is injected (if a suspension) or applied (if a mesh or wire) at locations on circular lines, preferably perpendicular to the electrical axis of the heart. In a particular embodiment the conductive material is injected or applied on one or more, preferably 2, 3, 4 or 5 circular lines perpendicular to the electrical axis of the right atrium (RA) of the heart. These circular lines thereafter serve as equipotential lines, and support synchronized depolarizations of cardiomyocytes in planes perpendicular to the physiological axis of cardiac contractions. As a result, lines of increased conductivity abrogate approaching rotors. FIG. 2a illustrates the situation before treatment, and FIG. 2b illustrates the state after creating lines with increased tissue conductivity.

Figure 1:
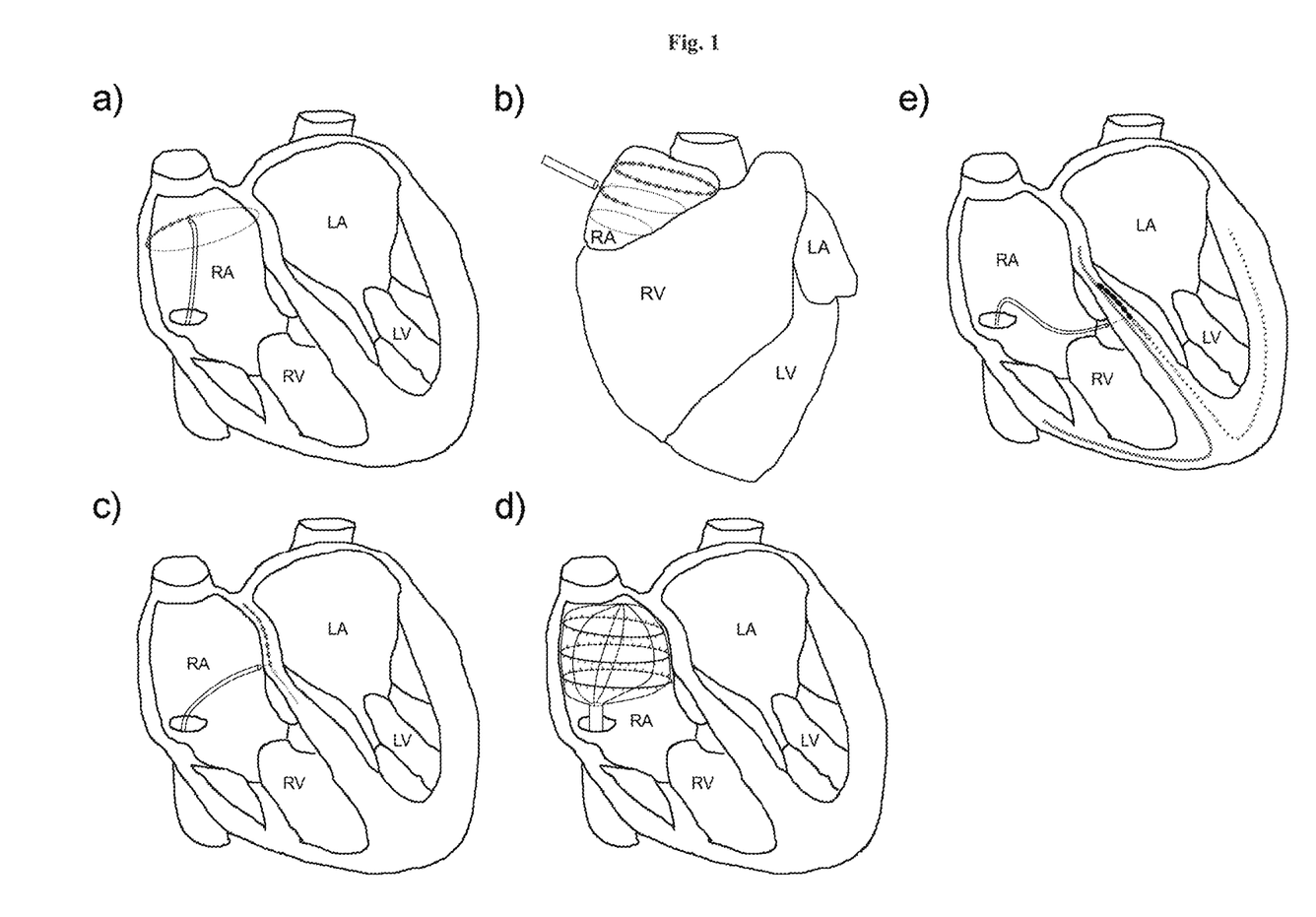

Lines of increased conductivity can be created either endocardially (FIG. 1b to 1d) or epicardially (FIG. 1a). An endocardial application can be performed with help of an injection catheter. An epicardial application can be performed either with help of an injection catheter or during an open heart surgery after thoracotomy. If cardiosurgical interventions are required for different indications, as bypass surgery or valve replacement, an epicardial application might be performed. To individually plan locations of the injection lines, an intracardial mapping of myocardial surface voltage can be performed.

In a preferred embodiment the conductive material is injected into the right atrium (RA), preferably at locations along lines following the location of the left bundle of His, at locations on a line along the atrioventricular node or on lines located along affected parts of the electrical conduction system.

The main purpose of injecting conductive materials is to increase tissue conductivity. However, an additional benefit results from effects of conductive materials on the protein expression in cardiomyocytes. It was shown that injection of carbon nanotubes causes an increase in the expression of connexins and gap junctions implying an improved conduction between adjacent cells [10,11]. Moreover, studies using in vitro models showed that carbon nanotubes and silver nanowires stimulated proliferation of cardiomyocytes [12, 13].

Another possible field of application are disorders of the electrical conduction system. In many cardiological pathologies, parts of the conduction system as the sinus node, the Bachmann bundle, the AV node, the bundle of His, or Purkinje fibers can be degenerated or interrupted. Furthermore, all of these conduction system defects can have congenital origin. To increase tissue conductivity on impaired tracts of the electrical conduction system, conductive materials can be injected on open lines to restore propagation of action potentials (FIG. 1c).

Left bundle branch blocks (LBBB) are a frequent pathology of the electrical conduction system. Cardiac resynchronization therapy (CRT) devices serve as a standard therapy in LBBB patients. A disadvantage of this therapy is that it requires a large amount of extraneous material that may be affected by mechanical defects or infections and might cause thrombi. CRT device implantations furthermore are interventions with interventional risks. Restoring tissue conductivity at locations of the left bundle of His by injecting conductive materials along lines between the AV node and the left ventricular wall might reestablish the function of this part of the conduction system. For this purpose, conductive materials have to be injected into the interventricular septum (FIG. 1e). Interventions in this part of the myocardium are usually linked to low risk of complications. In case of congenital impairments of the conduction system, as third-degree AV node block, increasing tissue conductivity by injecting conductive materials might be an alternative for heart surgery in pediatric patients and lifelong pacemaker dependency.

Figure 5:
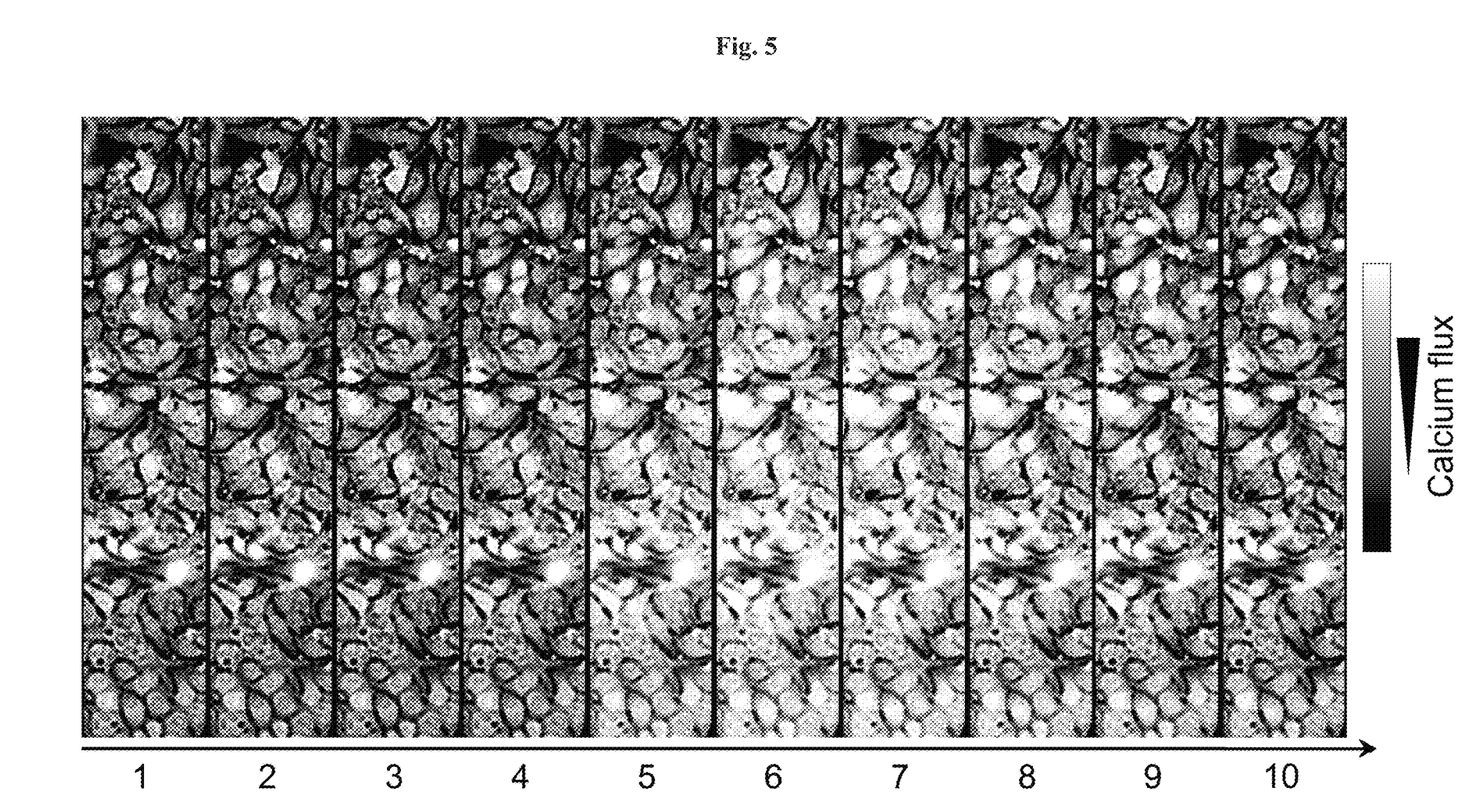

In a preferred embodiment, the conductive material is introduced in vitro into a patch of cardiomyocytes. This approach (FIGS. 5 and 6) represents an alternative to the injection into the native myocardium. The conductive material may be homogeneously distributed. In a preferred embodiment, the conductive material is introduced in one or more lines.

In a preferred embodiment the cardiomyocytes are differentiated from induced pluripotent stem cells (iPSCs). It is possible to derive iPSCs from skin or fat biopsies of patients. It is an established procedure to induce differentiation of iPSCs to either atrial or ventricular cardiomyocytes [14-16]. Moreover, iPSCs can be used to build cell patches that can be placed on the myocardium during open heart surgery or minimal-invasive interventions [17-19]. Patches of cardiomyocytes that can be placed on the myocardium are also denoted as "heart patches". Using heart patches with increased conductivity instead of injecting conductive materials in the native myocardium has the advantage that possible side effects related to the direct injection into the myocardium can be avoided.

Figure 6:
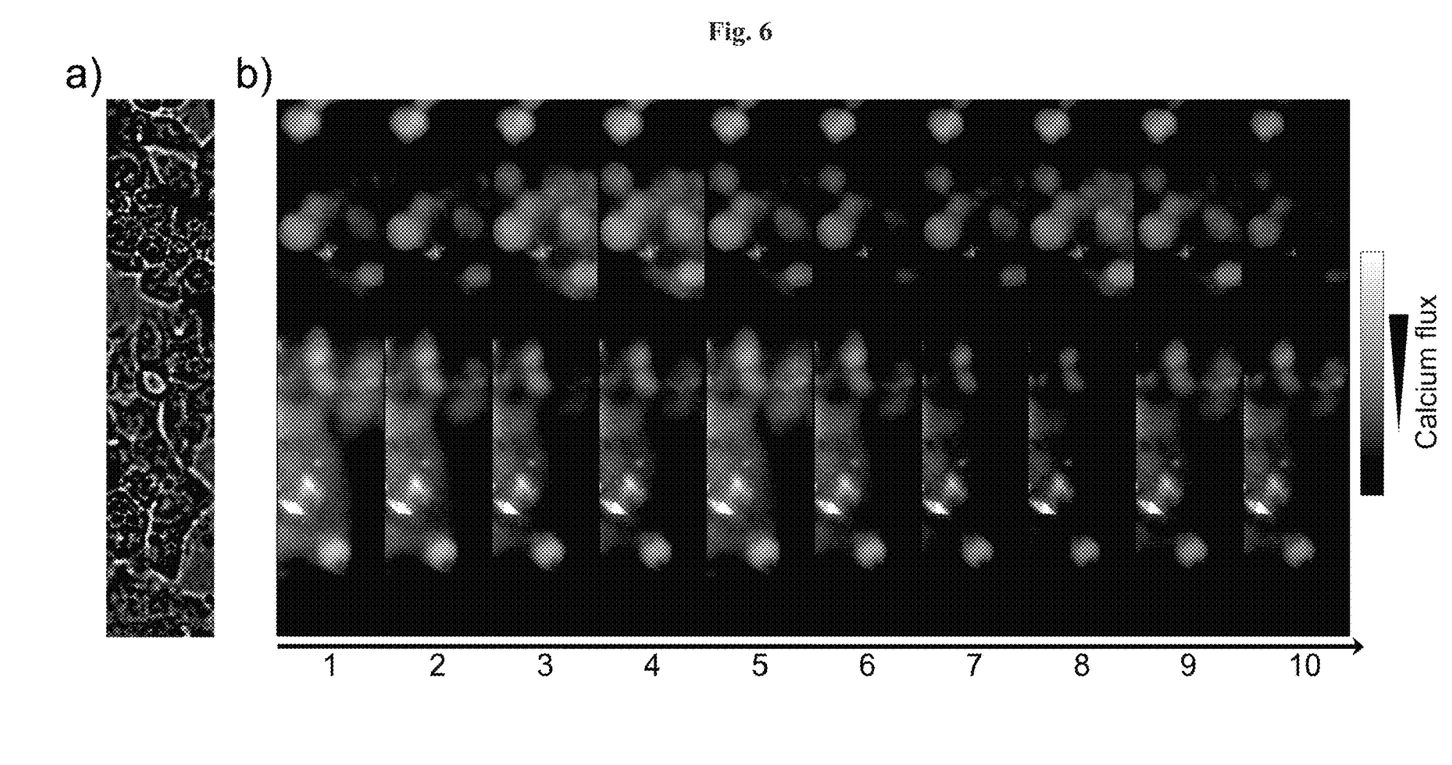

The described procedure for creating lines of increased tissue conductivity can be also applied in heart patches. During the procedure for manufacturing heart patches in the lab, conductive materials according to the present invention can be transferred to heart patches (FIG. 6). This can be achieved by placing the conductive material between several iteratively combined layers of cells that are part of the heart patch or by injection into the patch.

In a preferred embodiment, subsequent to introduction of the conductive material, the patch of cardiomyocytes is placed on the myocardium in a defined orientation, thereby effecting placement of the conductive material on the myocardium in one or more circular or open lines.

The architecture of heart patches can be adapted to the individual anatomy of the heart. Three dimensional information from tomographic imaging can be used to extract the shape of the outer myocardium surface. The 3D shape of the myocardium surface can be used to define the shape, size and orientation of a heart patch with increased conductivity. Thereafter, IPSC cells can be grown in the individually adapted shape before increasing the conductivity by injecting conductive materials. While manufacturing a heart patch in the lab, the orientation of the heart patch relative to the electrical heart axis can be defined and documented. Thereafter, conduction lines can be defined on heart patches that are perpendicular to the direction, in which electro-mechanical waves are propagated in the myocardium. Thus, when the heart patch is placed on the myocardium in a defined orientation, the conductive material will be present on/in the myocardium in lines having a defined orientation relative to the electrical axis of the heart. As described above, useful embodiments are circular lines perpendicular to the electrical axis of the heart, as well as lines, in particular open or straight lines, that follow the location of the left bundle of His, lines along the atrioventricular node or lines located along affected parts of the electrical conduction system.

Taken together, indications that may be treated with circular lines of increased conductivity are (1) atrial or ventricular arrhythmias, and (2) focal arrhythmias in patients with ischemic scars, possibly after myocardial infarction.

Indications that may be treated with creating open lines or straight lines are (1) any forms of AV blockade as congenital AV block, and (2) disorders of the electrical conduction system as complete or incomplete left or right bundle branch block. Left bundle branch block may be treated by injecting the conductive material for use according to the first aspect of the invention in the myocardium at locations along lines following the location of the left bundle of His. Third-degree atrioventricular node block may be treated by injecting the conductive material for use according to the first aspect of the invention in the myocardium at locations on a line along the atrioventricular node.

Alternatively, instead of direct injection into the myocardium, patches of cardiomyocytes comprising lines of increased conductivity formed by a conductive material according to the first aspect of the invention are attached to the myocardium in a defined orientation, thereby generating lines of enhanced conductivity in the myocardium, e.g. circular lines perpendicular to the electrical axis of the heart, or lines following the location of the left bundle of His, lines along the atrioventricular node or lines located along affected parts of the electrical conduction system. The effect of the lines of enhanced connectivity created by placement of the patch of cardiomyocytes on the myocardium is essentially the same as the effect of the lines of enhanced connectivity created by direct injection into the myocardium.

In a second aspect the present invention relates to a patch of cardiomyocytes suitable for placement on the myocardium comprising areas, in particular lines, of enhanced conductivity formed by a conductive material selected from a plurality of conductive particles, a mesh or wire, or a plurality of cardiomyocytes expressing at least one conductive protein. The conductive particles, mesh or wire are the same materials as described with regard to the first aspect of the invention.

The skilled person is well aware how to stably express a protein of interest in iPSCs or iPSC-derived cardiomyocytes [20-23]. For instance, connexin-43 was stably expressed in human iPSCs [24]. Notably, enhancing connexin-43 could improve electrical properties of iPSC-cardiomyocytes [25]. Suitable gene therapeutic methods are well known in the art and comprise the use of viral vectors that stably integrate into the genome of the cardiomyocytes like, e.g. retroviral vectors or adeno-associated virus vectors or that are episomally maintained in the transfected cell like, e.g. adenoviral vectors as previously demonstrated by the inventors and others [26, 27]. Alternatively, iPSCs or cardiomyocytes may be modified by homologous recombination or gene editing like, e.g. CRISPR/CAS [28]. Typically, the nucleic acid encoding the protein of interest, in the present case a nucleic acid encoding a conductive protein, comprises transcription control elements including enhancer and/or promoter elements. Preferred transcriptional promoter elements are strong constitutive promoters, which may be derived from so-called housekeeping genes or from viral genes [28]. Examples are GAPDH promoter, SV40 promoter and CMV IE promoter. Such promoters typically lead to a strong expression of the protein of interest. Alternatively, the promoter may be a cardiomyocyte specific promoter like, e.g. cardiac troponin T promoter (TNNT2), MYH6, promoter, MYH7 promoter or MYL2 promoter [26, 29, 30]. In another alternative the promoter may be regulatable. Examples of such promoters comprise the $Tet^{on}$ or $Tet^{off}$ promoter that are either active or inactive in the presence or active and inactive in the absence of tetracycline [31, 32]. In a preferred embodiment the regulatable promoter is active in the absence of tetracycline. Depending on the dose of the respective regulatory compound administered to a patient it is possible to modulate the expression level of the conductive protein in the cardiomyocytes to modify the effect of the conductivity depending on the patients response. Stable expression is, however, preferred since typically the therapy has to be applied permanently.

It is preferred that the at least one conductive protein is overexpressed in the cardiomyocytes. Overexpression in the context of the expression of a conductive protein in cardiomyocytes means that the protein amount is higher than the amount of that protein present in healthy cardiomyocytes. It is preferred that the amount of conductive protein is at least 2-fold higher, preferably at least 3-fold, 4-fold, 5-fold or 10-fold higher than in healthy cardiomyocytes. The skilled person is well aware of how to measure the amount of protein directly or indirectly. The direct measurement is on the level of protein and the indirect measurement on the level of mRNA encoding the conductive protein. Preferably, the amount of the conductive protein is measured on the level of the protein, e.g. by antibodies specifically binding to the conductive protein.

A suitable conductive protein may be selected from the group consisting of connexin-40, connexin-41, connexin-42, connexin-43 and connexin-45.

In a third aspect the present invention relates to the use of the patch of cardiomyocytes according to the second aspect in a method of treatment or prevention of irregular electro-mechanical waves in the myocardium for treating a cardiovascular disease.

In a fourth aspect the present invention relates to an injection catheter configured to locally inject conductive material as used in the first aspect of the invention into the myocardium comprising or consisting of a catheter tube, and an injection device configured to be moved in and out of the catheter. Preferably the injection device comprises a needle.

In a fifth aspect the present invention relates to an injection catheter configured to locally inject conductive material as used in the first aspect of the invention into the myocardium comprising or consisting of an inflatable balloon configured to unfold a cage in the RA and a cage comprising injection ducts and injection needles for injecting said conductive materials at locations on one or several circular lines. The injection ducts are connected with the needles thereby allowing endocardial injection of the conductive suspension for use according to the present invention into the myocardium. The injection ducts facilitate the flow of the conductive suspension to the injection needles. Typically, the conductive solution is provided from a reservoir positioned outside the patient.

In a sixth aspect the present invention relates to methods using the conductive material for use according to the first aspect of the invention or the patch of cardiomyocytes according to the second aspect of the invention for treating or preventing irregular electromechanical waves in the myocardium for treating a cardiovascular disease.

In a preferred embodiment, the method comprises injection of a conductive emulsion, conductive suspension or conductive solution into the myocardium on circular or open lines, in a particular a conductive suspension comprising conductive particles selected from carbon micro particles, preferably amorphous carbon powder or carbon nanotubes, and noble metal micro particles, preferably silver, gold or platinum micro particles or nanowires, thereby generating lines of increased conductivity in the myocardium.

In a preferred embodiment, the method comprises attachment of a conductive mesh or wire to the myocardium, in particular a mesh or wire comprising or consisting of a noble metal or graphene or a biologically compatible material coated with a noble metal, thereby generating lines of increased conductivity in the myocardium.

In a preferred embodiment, the method comprises placement of a patch of cardiomyocytes according to the second aspect of the invention on the myocardium in a defined orientation, thereby generating lines of increased conductivity in the myocardium.

Using any of the above described methods, lines of increased connectivity are generated in the myocardium.

The present invention relates in particular to a method for increasing tissue conductivity in the myocardium by injecting conductive materials, as carbon nanotubes, silver, gold or platinum nanowires, on circular (FIG. 1a, b and d) or open lines (FIG. 1c).

The present invention relates in particular to a method for treating arrhythmias, as atrial fibrillation, by creating circular lines of increased conductivity that serve as equipotential lines and can inhibit rotating electromechanical waves, due to the injection of conductive materials (FIG. 1a, b and d).

The present invention relates in particular to a method for treating pathological alterations of the electrical conduction system of the heart by injecting conductive materials in the myocardium at locations on lines (FIG. 1c). The injection lines are located along affected parts of the electrical conduction system.

The present invention relates in particular to a method for treating left bundle branch block by injecting conductive materials in the myocardium at locations along lines following the location of the left bundle of His.

The present invention relates in particular to a method for treating third-degree atrioventricular node block by injecting conductive materials in the myocardium at locations on a line along the atrioventricular node.

REFERENCES

1. Wang J, Bourne G W, Wang Z, Villemaire C, Talajic M, Nattel S. Comparative mechanisms of antiarrhythmic drug action in experimental atrial fibrillation. Importance of use-dependent effects on refractoriness. Circulation. 1993;88: 1030-1044.

2. Jalife J, Berenfeld O, Mansour M. Mother rotors and fibrillatory conduction: a mechanism of atrial fibrillation, Cardiovasc Res. 2002;54: 204-216.

3. Pandit S V, Jalife J. Rotors and the dynamics of cardiac fibrillation. Circ Res. 2013;112: 849-862. doi:10.1161/CIRCRESAHA.111.300158

4. Nattel S, Xiong F, Aguilar M. Demystifying rotors and their place in clinical translation of atrial fibrillation mechanisms. Nat Rev Cardiol. 2017;14: 509-520. doi:10.1038/nrcardio.2017.37

5. Christoph J, Chebbok M, Richter C, Schröder-Schetelig J, Bittihn P, Stein S, et al. Electromechanical vortex filaments during cardiac fibrillation. Nature. 2018;555: 667-672. doi:10.1038/nature26001

6. Schmidt C, Kisselbach J, Schweizer P A, Katus H A, Thomas D. The pathology and treatment of cardiac arrhythmias: focus on atrial fibrillation. Vasc Health Risk Manag. 2011;7: 193-202. doi:10.2147/VHRM.S10758

7. Schricker A A, Lalani G G, Krummen D E, Narayan S M. Rotors as drivers of atrial fibrillation and targets for ablation. Curr Cardiol Rep. 2014;16: 509. doi:10.1007/s11886-014-0509-0

8. Guillem M S, Climent A M, Rodrigo M, Fernández-Avilés F, Atienza F, Berenfeld O. Presence and stability of rotors in atrial fibrillation: evidence and therapeutic implications. Cardiovasc Res. 2016;109: 480-492. doi:10.1093/cvr/cvw011

9. Bond R, Olshansky B, Kirchhof P. Recent advances in rhythm control for atrial fibrillation. F1000Research. 2017; 6: 1796. doi:10.12688/f1000research.11061.1

10. Arnoldussen Y J, Anmarkrud K H, Skaug V, Apte R N, Haugen A, Zienolddiny S. Effects of carbon nanotubes on intercellular communication and involvement of IL-1 genes. J Cell Commun Signal. 2016;10: 153-1.62. doi:10.1007/s12079-016-0323-0

11. Sun H, Lü S, Jiang X-X, Li X, Li H, Lin Q, et al. Carbon nanotubes enhance intercalated disc assembly in cardiac myocytes via the β1-integrin-mediated signaling pathway. Biomaterials. 2015;55: 84-95. doi:10.1016/j.biomaterials.2015.03.030

12. Martinelli V, Cellot G. Toma F M, Long C S, Caldwell J H, Zentilin L, et al. Carbon Nanotubes Instruct Physiological Growth and Functionally Mature Syncytia: Nongenetic Engineering of Cardiac Myocytes. ACS Nano. 2013;7: 5746-5756. doi:10.1021/nn4002193

13. Wickham A, Vagin M, Khalaf H, Bertazzo S, Hodder P, Dånmark S, et al. Electroactive biomimetic collagen-silver nanowire composite scaffolds. Nanoscale. 2016;8: 14146-14155. doi:10.1039/c6nr02027e.

14. Madonna R, Van Laake L W, Botker H E, et al. ESC Working Group on Cellular Biology of the Heart: Position paper for Cardiovascular Research: tissue engineering strategies combined with cell therapies for cardiac repair in ischaemic heart disease and heart failure. Cardiovasc Res. 2019;115(3):488-500, doi:10.1093/cvr/cvz010

15. Shi Y, Inoue H, Wu J C, Yamanaka S. Induced pluripotent stem cell technology: A decade of progress. Nat Rev Drug Discov. 2017;16(2):115-130. doi:10.1038/nrd.2016.245

16. Cyganek L, Tiburcy M, Sekeres K, et al. Deep phenotyping of human induced pluripotent stem cell-derived atrial and ventricular cardiomyocytes. JCI Insight. 3(12). doi:10.1172/jci.insight.99941

17. Wendel J S, Ye L, Tao R, et al. Functional Effects of a Tissue-Engineered Cardiac Patch From Human Induced Pluripotent Stem Cell-Derived Cardiomyocytes in a Rat Infarct Model. Stem Cells Transl Med. 2015;4(11):1324-1332. doi:10.5966/sctm.2015-0044

18. Gao L, Gregorich Z R, Zhu W, et al. Large Cardiac Muscle Patches Engineered From Human Induced-Pluripotent Stem Cell-Derived Cardiac Cells Improve Recovery From Myocardial Infarction in Swine. Circulation. 2018; 137(16):1712-1730. doi:10.1161/CIRCULATIONAHA.117.030785

19. Sugiura T, Hibino N, Breuer C K, Shinoka T. Tissue-engineered cardiac patch seeded with human induced pluripotent stem cell derived cardiomyocytes promoted the regeneration of host cardiomyocytes in a rat model. J Cardiothorac Surg. 2016;11(1):163. doi:10.1186/s13019-016-0559-z 20. Rao M S, Malik N. Assessing iPSC reprogramming methods for their suitability in translational medicine. Journal of Cellular Biochemistry. 2012;113(10):3061-3068. doi: 10.1002/jcb.24183

21. Huber I, Itzhaki I, Caspi O, et al. Identification and selection of cardiomyocytes during human embryonic stem cell differentiation. The FASEB Journal. 2007;21(10):2551-2563. doi:10.1096/fj.05-5711com 22. Funakoshi S, Miki K, Takaki T, et al, Enhanced engraftment, proliferation, and therapeutic potential in heart using optimized human iPSC-derived cardiomyocytes. Scientific Reports. 2016;6:19111. doi:10.1038/srep19111

23. Zaragosi L-E, Billon N, Ailhaud G, Dani C. Nucleofection is a valuable transfection method for transient and stable transgene expression in adipose tissue-derived stem cells. Stem Cells. 2007;25(3):790-797. doi:10.1634/stemcells.2006-0235

24. Ke Q, Li L, Cai B, et al. Connexin 43 is involved in the generation of human-induced pluripotent stem cells. Hum Mol Genet. 2013;22(11):2221-2233. doi:10.1093/hmg/ddt074

25. Sottas V, Wahl C-M, Trache M C, et al. Improving electrical properties of iPSC-cardiomyocytes by enhancing Cx43 expression. Journal of Molecular and Cellular Cardiology. 2018;120:31-41. doi:10.1016/j.yjmcc.2018.05.010

26. Schmidt C, Wiedmann F, Katus H, Thomas D, Müller O. Kcnk3-based gene therapy of cardiac arrhythmia. April 2019. WO2019073058A1

27. Hotta A, Yamanaka S. From Genomics to Gene Therapy: Induced Pluripotent Stem Cells Meet Genome Editing. Annual Review of Genetics. 2015;49(1):47-70. doi:10.1146/annurev-genet-112414-054926

28. Byrne S M, Mali P, Church G M. Genome editing in human stem cells, Meth Enzymol. 2014;546:119-138. doi: 10.1016/B978-0-12-801185-0.00006-4

29. Veevers J, Farah E N, Corselli M, et al. Cell-Surface Marker Signature for Enrichment of Ventricular Cardiomyocytes Derived from Human Embryonic Stem Cells. Stem Cell Reports. 2018;11(3):828-841. doi:10.1016/j.stemcr.2018.07.007

30. Christoforou N, Liau B, Chakraborty S, Chellapan M, Bursac N, Leong K W. Induced Pluripotent Stem Cell-Derived Cardiac Progenitors Differentiate to Cardiomyocytes and Form Biosynthetic Tissues. PLoS One. 2013;8(6). doi:10.1371/journal.pone.0065963

31. Castaño J, Buenas C, Jiménez-Delgado S. et at Generation and characterization of a human iPSC cell line expressing inducible Cas9 in the "safe harbor" AAVS1 locus. Stem Cell Res. 2017;21:137-140. doi:10.1016/j.scr.2017.04.011

32. Akhtar A A, Breunig J J. Tetracycline-inducible and reversible stable gene expression in human iPSC-derived neural progenitors and in the postnatal mouse brain. Curr Protoc Stem Cell Biol. 2017;41:5A.9.1-5A.9.12. doi: 10.1002/cpsc.28

The invention claimed is:

1. A method of treating irregular electromechanical waves in the myocardium of a subject with a cardiovascular disease, the method comprising injection of a conductive suspension into the myocardium on one or more lines, wherein the one or more lines are circular lines perpendicular to the electrical axis of the heart or open lines; wherein the open lines are selected from a group consisting of lines along the left bundle of His, lines along the atrioventricular node, and lines located along affected parts of the electrical conduction system,
   wherein the conductive suspension comprises carbon micro particles or noble metal micro particles, and
   wherein the injection along circular or open lines supports synchronized depolarizations of cardiomyocytes.

2. The method of claim 1, wherein the conductive suspension has a conductivity of at least $1\times10^3$ S/m at 298 K.

3. The method of claim 1, wherein the cardiovascular disease is selected from the group consisting of arrhythmia, atrial fibrillation, first, second or third-degree atrioventricular node block, left, right or trifascicular bundle branch block, sinus node dysfunction, Bachmann bundle dysfunction, atrial conducting disorder, His bundle dysfunction, pathological alterations of the electrical conduction system of the heart, dysfunction of the electro-mechanical coupling, mitochondrial or sarcomere disorders, metabolic diseases as M. Wilson, channelopathies, ischemia, fibrosis or inflammation of the myocardium, and iatrogenic defects of the myocardium as consequence of ablation therapy.

4. The method of claim 1, wherein the circular lines serve as equipotential lines and inhibit rotating electromechanical waves.

5. The method of claim 1, wherein the open lines are in the right atrium (RA) at locations along lines following the location of the left bundle of His, or at locations on a line along the atrioventricular node.

6. The method of claim 1, wherein the conductive suspension is injected into the myocardium through an injection catheter.

7. The method of claim 6, wherein the injection catheter comprises a catheter tube, and an injection device configured to be moved in and out of the catheter.

8. The method of claim 6, wherein the injection catheter comprises an inflatable balloon configured to unfold a cage in the RA and a cage comprising injection ducts and injection needles for injecting said conductive suspension at locations on one or several circular lines.

9. A method of treating or preventing irregular electromechanical waves in the myocardium of a subject with a cardiovascular disease, comprising:
   introducing in patches of cardiomyocytes the conductive suspension of claim 1; and
      placing the patches of cardiomyocytes on the myocardium in a defined orientation, thereby effecting placement of the conductive suspension on the myocardium in one or more lines,
wherein the one or more lines are circular lines perpendicular to the electrical axis of the heart or open lines; wherein the open lines are selected from a group consisting of lines along the left bundle of His, lines along the atrioventricular node, and lines located along affected parts of the electrical conduction system, and
wherein the placement along circular or open lines supports synchronized depolarizations of cardiomyocytes.

10. The method of claim 1, wherein the one or more lines are circular lines perpendicular to the electrical axis of the heart and the cardiovascular disease is arrhythmia or left atrial tachycardia.

11. The method of claim 10, wherein the arrhythmia is selected from atrial arrhythmia, atrial fibrillation, atrial flutter, ventricular arrhythmia, and focal arrhythmia in patients with ischemic scars.

12. The method of claim 1, wherein the one or more lines are open lines located along affected parts of the electrical conduction system, and the cardiovascular disease is a disorder of the electrical conduction system.

13. The method of claim 12, wherein the disorder of the electrical conduction system is selected from the group consisting of first, second or third-degree atrioventricular node block, left, right or trifascicular bundle branch block, sinus node dysfunction, Bachmann bundle dysfunction, His bundle dysfunction, dysfunction of the electro-mechanical coupling, and iatrogenic defects of the myocardium as consequence of ablation therapy.

* * * * *